United States Patent [19]

Kobayashi

[11] Patent Number: 4,833,705
[45] Date of Patent: May 23, 1989

[54] DATA COMMUNICATION APPARATUS

[75] Inventor: Makoto Kobayashi, Tama, Japan

[73] Assignee: Canon Kabushiki Kaisha, Tokyo, Japan

[21] Appl. No.: 896,640

[22] Filed: Aug. 15, 1986

[30] Foreign Application Priority Data

Aug. 20, 1985 [JP] Japan .................................. 60-180921

[51] Int. Cl.⁴ ........................ H04M 11/00; H04N 1/00
[52] U.S. Cl. ...................................... 379/93; 379/100; 379/355
[58] Field of Search .................. 179/2 DP, 2 A, 90 B, 179/90 BB, 90 BD; 358/257, 257; 379/100, 355, 93, 96, 97, 98

[56] References Cited

U.S. PATENT DOCUMENTS

| | | | |
|---|---|---|---|
| 4,113,993 | 9/1978 | Heckman et al. | 179/90 B |
| 4,291,198 | 9/1981 | Anderson et al. | 179/2 DP |
| 4,502,080 | 2/1985 | Tsuda . | |
| 4,503,288 | 3/1985 | Kessler | 179/2 DP |
| 4,524,244 | 6/1985 | Faggin et al. | 179/2 DP |
| 4,524,393 | 6/1985 | Ohzeki | 358/257 |
| 4,532,379 | 7/1985 | Tsukioka | 179/2 R |
| 4,567,322 | 1/1986 | Tsuda | 179/2 A |
| 4,581,656 | 4/1986 | Wada | 358/257 |
| 4,586,086 | 4/1986 | Ohzeki | 358/256 |

FOREIGN PATENT DOCUMENTS

3439867 5/1985 Fed. Rep. of Germany ...... 379/100

Primary Examiner—Keith E. George
Attorney, Agent, or Firm—Fitzpatrick, Cella, Harper & Scinto

[57] ABSTRACT

A communication system includes a console unit having a plurality of one-touch dial keys and adbridged dial keys; a nonvolatile RAM for storing two different selection signal data in correspondence with a single key input from the console unit; an NCU for supplying a selection signal onto a communication line; an original detector for detecting the presence/absence of an original sheet; and a system controller for selectively reading out the two different selection signal data from the nonvolatile RAM in accordance with the presence/absence of the original sheet.

8 Claims, 8 Drawing Sheets

| | | 61 | | | | | | 62 | | | | | 63 |
|---|---|---|---|---|---|---|---|---|---|---|---|---|---|
| A | 1 | 0 3 — 1 2 3 — 4 5 6 7 |
| A | 0 | 0 3 — 1 2 3 — 4 5 6 8 |
| B | 1 | 0 4 5 — 9 8 7 — 6 5 4 3 |
| B | 0 | 0 4 5 — 9 8 7 — 6 5 4 4 |
| C | 1 | 0 3 — 4 5 6 — 5 4 3 2 |
| C | 0 | 0 4 5 — 9 8 7 — 1 2 3 4 |
| D | 1 | 0 1 2 3 — 4 5 — 6 7 8 9 |
| D | 0 | 0 1 2 3 — 4 5 — 6 5 4 3 |
| E | 1 | 0 3 2 1 — 2 3 — 4 5 6 7 |
| E | 0 | 0 4 5 — 9 8 7 — 1 2 3 4 |
| ⋮ | | |
| F | 1 | 0 3 — 4 5 6 — 7 8 9 0 |
| F | 0 | 0 3 — 4 5 6 — 7 8 9 1 |
| * 01 | 1 | 0 2 4 — 1 3 5 — 2 4 6 8 |
| * 01 | 0 | 0 2 4 — 1 3 5 — 2 4 6 9 |
| ⋮ | | |
| * 99 | 1 | 0 1 3 — 2 4 6 — 1 3 5 7 |
| * 99 | 0 | 0 1 3 — 2 4 6 — 1 3 5 6 |

FIG. 6

FIG. 7B

DATA COMMUNICATION APPARATUS

BACKGROUND OF THE INVENTION

1. Field of the Invention

The present invention relates to a communication system.

2. Related Background Art

Conventionally, in a system of this type, e.g., in a facsimile system having an automatic dialing function, the following means is adopted to allow easy selection of telephone numbers destinations which are frequently called. More specifically, a predetermined number of telephone numbers are prestored in a non-volatile RAM (including a battery backed up RAM), or the like, a destination selection signal is sent out in a one-touch dialing selection mode upon operation of key switches by an operator or, in an abridged dialing selection mode, upon operation of a key switch indicating an abridged dialing mode and a numerical key or the like, thus switching an operation mode to a facsimile communication mode after a line is connected to the destination.

For this purpose, a single one-touch dial key or abridged telephone number must be assigned to a single destination telephone number. Therefore, if a large number of destination telephone numbers must be selected, the number of keys are greatly increased in accordance with the number of destination telephone numbers, thus increasing the size of an operation panel. In addition, when a destination telephone number for a telephone mode is to be selected in the one-touch dialing selection or abridged dialing selection mode, the operation mode may be accidentally switched to the facsimile communication mode.

SUMMARY OF THE INVENTION

It is an object of the present invention to provide an improved communication system.

It is another object of the present invention to provide a communication system free from these conventional drawbacks.

It is still another object of the present invention to provide a compact communication system with high operability.

It is still another object of the present invention to provide a communication system which can select a destination in accordance with the presence/absence of communication data.

It is still another object of the present invention to provide a communication system for automatically performing a communication operation, which can perform different communication operations in accordance with the presence/absence of communication data.

It is still another object of the present invention to provide a communication system having an automatic dialing function, in which different destinations to be automatically called can be selected in accordance with the presence/absence of communication data.

It is still another object of the present invention to provide a communication system having an automatic dialing function by means of a one-touch dial key or an abridged dial key, in which a single dial key can be assigned to two different telephone numbers, thus allowing selection of different destinations in accordance with the presence/absence of communication data.

Other objects, features and advantages of the present invention will be apparent from the following detailed description of the preferred embodiments.

DETAILED DESCRIPTION OF THE PREFERRED EMBODIMENTS

An embodiment of the present invention will now be described with reference to the accompanying drawings.

Figure 1:
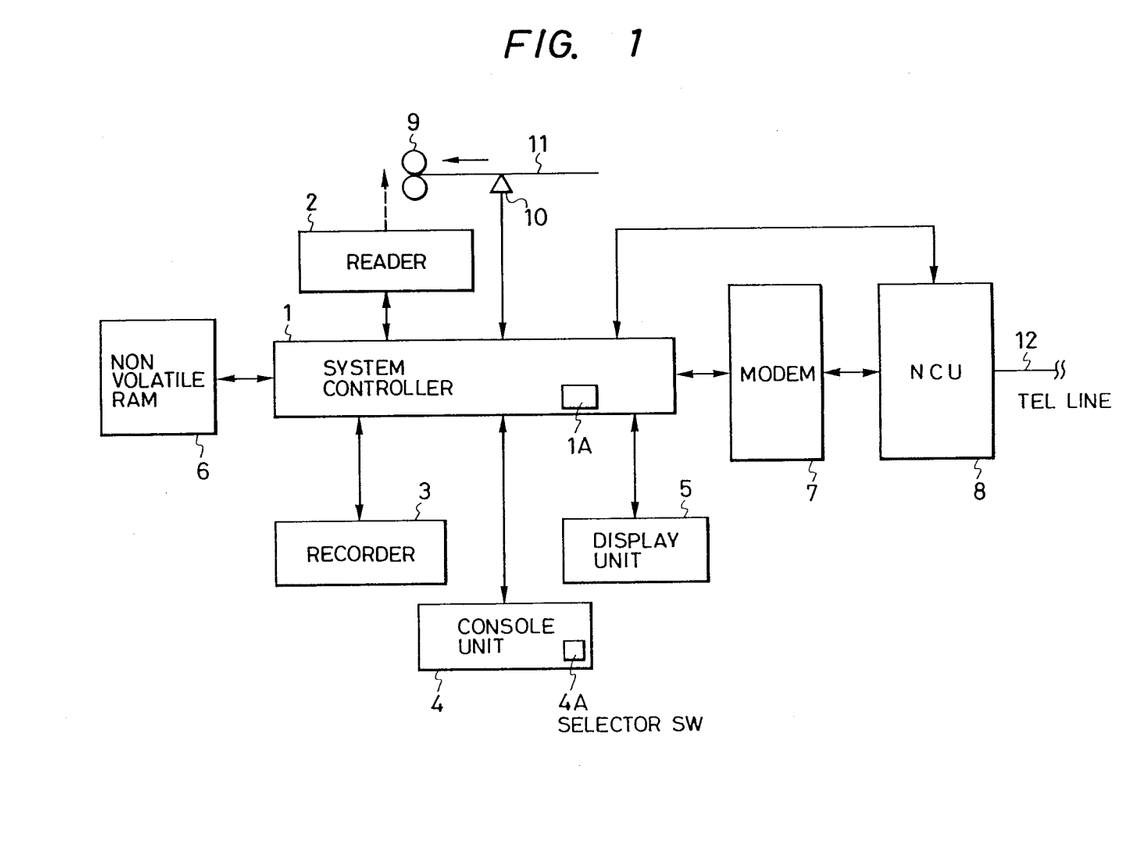
FIG. 1 is a block diagram showing an arrangement of an embodiment of the present invention.

FIG. 1 is a block diagram of a facsimile system according to an embodiment of the present invention.

Figure 2:
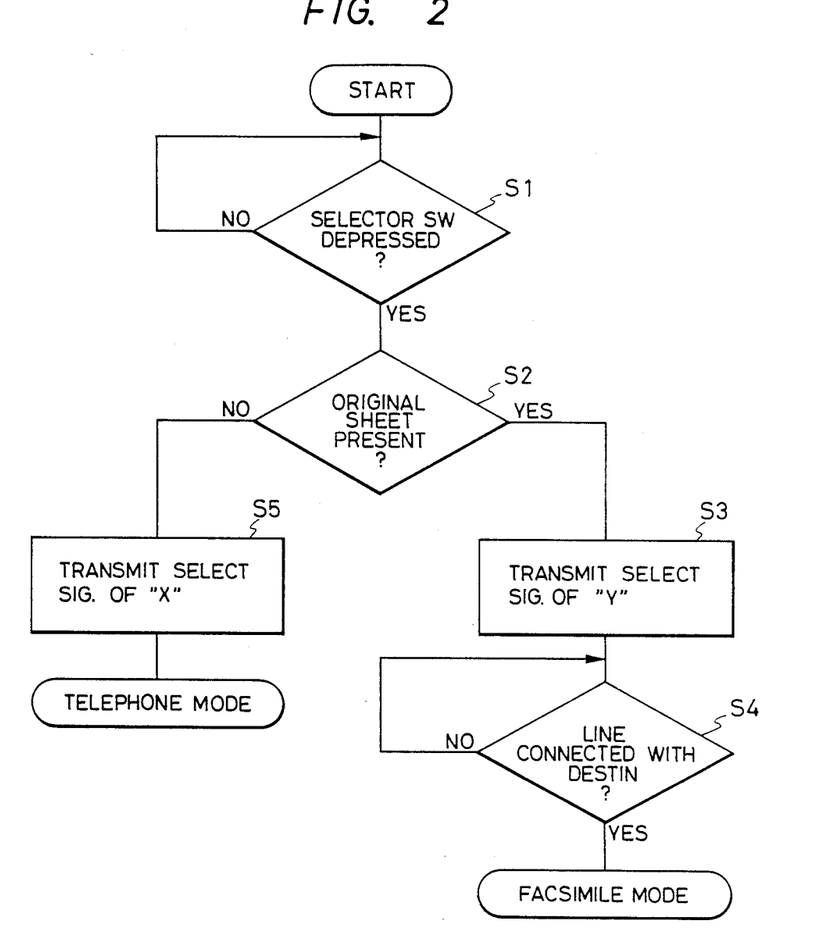
FIG. 2 is a flow chart showing a control operation of a system, controller 1 in the embodiment shown in FIG. 1.

A system controller 1 comprises, e.g., a microcomputer, a storage circuit, and the like, and includes a Read-Only Memory (ROM) 1A prestoring a control sequence shown in FIG. 2.

A reader 2 comprises a CCD image sensor for scanning an original sheet 11 to be transmitted and conveyed by original convey rollers 9. In this way image data is set in the apparatus and communicated, eventually to a destination station comprising a telephone. The original sheet 11 is detected at a predetermined time by an original sensor 10, as will be described later.

A recorder 3 forms, e.g., an electrostatic image corresponding to a received image signal on a recording sheet. A console unit 4 has various operation keys and includes a selector switch 4A according to the present invention. Note that the console unit 4 and a display unit 5 can be constituted as a single console/display unit.

A nonvolatile RAM 6 prestores destination telephone numbers, as will be described later. The RAM 6 can be a RAM backed up by a battery. A modem (modulation/demodulation device) 7 is connected to the system controller 1.

An NCU (network control unit) 8 is provided for sending out a selection signal (pulse and tone dialer). The NCU 8 performs not only an automatic incoming call reception operation and a line control operation by detecting a ringing tone, but also a sending operation for sending a selection signal to a telephone line 12 under the control of the system controller 1 for selecting a destination station, corresponding to the destination telephone number selected by depressing switch 4A and stored in RAM 6.

The operation of this embodiment will be described with reference to the flow chart shown in FIG. 2. Note that a destination telephone number "X" for a telephone mode and a destination telephone number "Y" for a facsimile mode are assigned to correspond with the selector switch 4A on the console unit 4 and are registered in the nonvolatile RAM 6 in advance.

It is checked in step S1 if the selector switch 4A arranged on the console unit 4 is depressed. If YES in step S1, the flow advances to step S2, and the system controller 1 checks the presence/absence of the original sheet 11 in accordance with the output from the sensor 10. If YES step S2, the flow advances to step S3, and the destination telephone number "Y" for the facsimile is read or retrieved out from the nonvolatile RAM 6 and the selection signal for the readout telephone number is sent from the NCU 8 onto the telephone line 12. It is checked in step S4 if the telephone line is connected to the destination. If YES in step S4, the operation mode is switched to the facsimile transmission mode and a predetermined transmission operation is performed.

If NO in step S2, i.e., if no original sheet 11 is detected by the sensor 10, the flow advances to step S5, and the destination telephone number "X" for the telephone mode is read out from the nonvolatile RAM 6, and the selection signal corresponding thereto is sent onto the telephone line 12. Thereafter, the operation mode is switched to the telephone mode, and a so-called on-hook dialing operation in which a response of the destination can be monitored through a loudspeaker or the like is performed.

With this embodiment, the number of selection key switches can be greatly reduced when compared to the assigned number of destination telephone numbers. In addition, the telephone mode and the facsimile mode can be automatically selected in accordance with the presence/absence of an original sheet to be transmitted In this embodiment a plurality of destination telephone numbers are registered to correspond with one-touch key switches. Alternatively, in the case of a so-called abridged dialing selection mode, two telephone numbers can be assigned to a single abridged number in accordance with the presence/absence of an original sheet to be transmitted and can be registered in a nonvolatile RAM in advance.

In this embodiment, when an original sheet to be transmitted is detected, the operation mode is automatically switched to the facsimile transmission mode. Alternatively, if an original sheet is not detected, the operation mode is switched to the telephone mode, and after an operator confirms connection with a destination, i.e., only when a facsimile is connected, he can depress a transmission start key. In this case, two normal telephone numbers can be assigned to a single key.

In this embodiment, different transmission operations of destination telephone numbers using one-touch keys or abridged dialing can be performed in accordance with whether or not transmission data is stored in a memory or the like.

This embodiment is not limited to the facsimile system but can be applied to all other communication systems having an automatic dialing function.

According to this embodiment as described above, since destinations can be selected in accordance with the presence/absence of transmission data, the number of selection key switches on a console unit can be reduced, and the communication system can be efficiently used by simply detecting the presence/absence of transmission data.

The above-mentioned embodiment of the present invention will be described in more detail with respect to another embodiment of the present invention.

Figure 3:
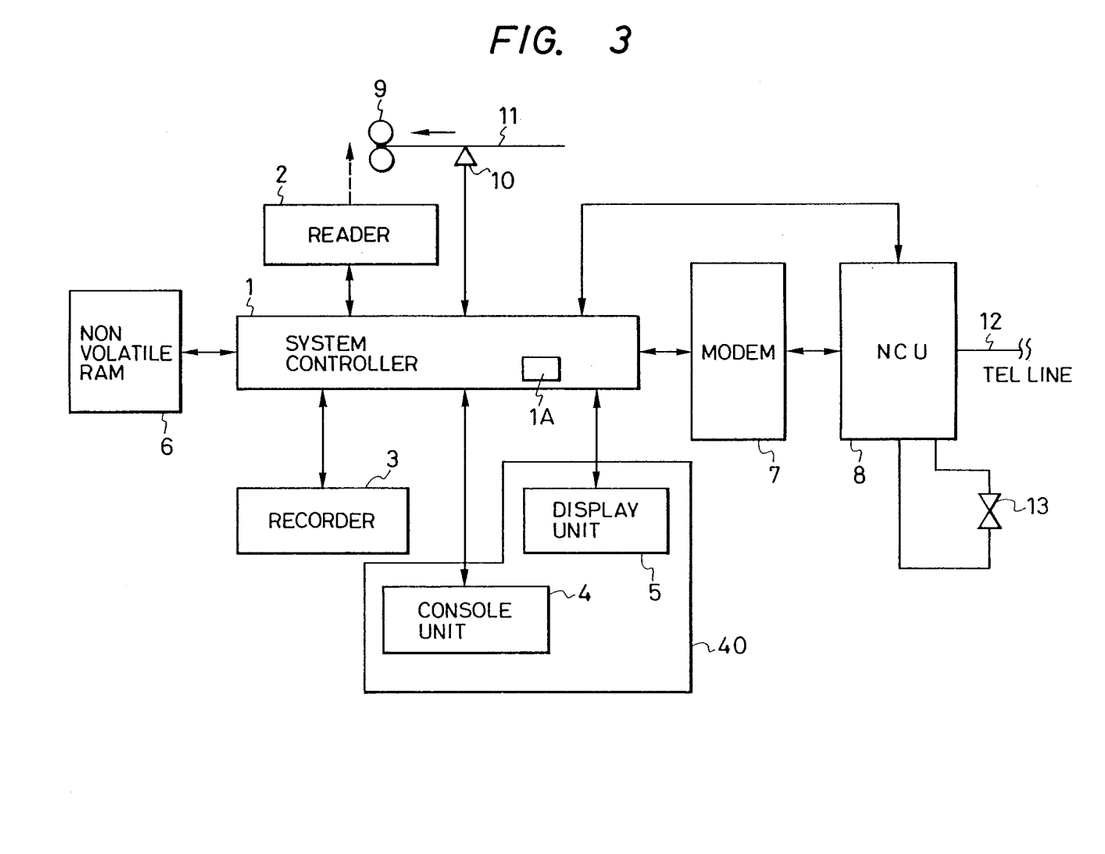
FIG. 3 is a block diagram showing an arrangement of another embodiment of the present invention.

FIG. 3 is a block diagram of a facsimile system according to another embodiment of the present invention. The same reference numerals in FIG. 3 denote the same parts as in FIG. 1, and a detailed description thereof will be omitted. The difference between the embodiments shown in FIGS. 3 and 1 is that the console unit 4 and the display unit 5 are combined as a single console/display unit 40, and that a handset 13 of a telephone set for communication is added.

Figure 4:
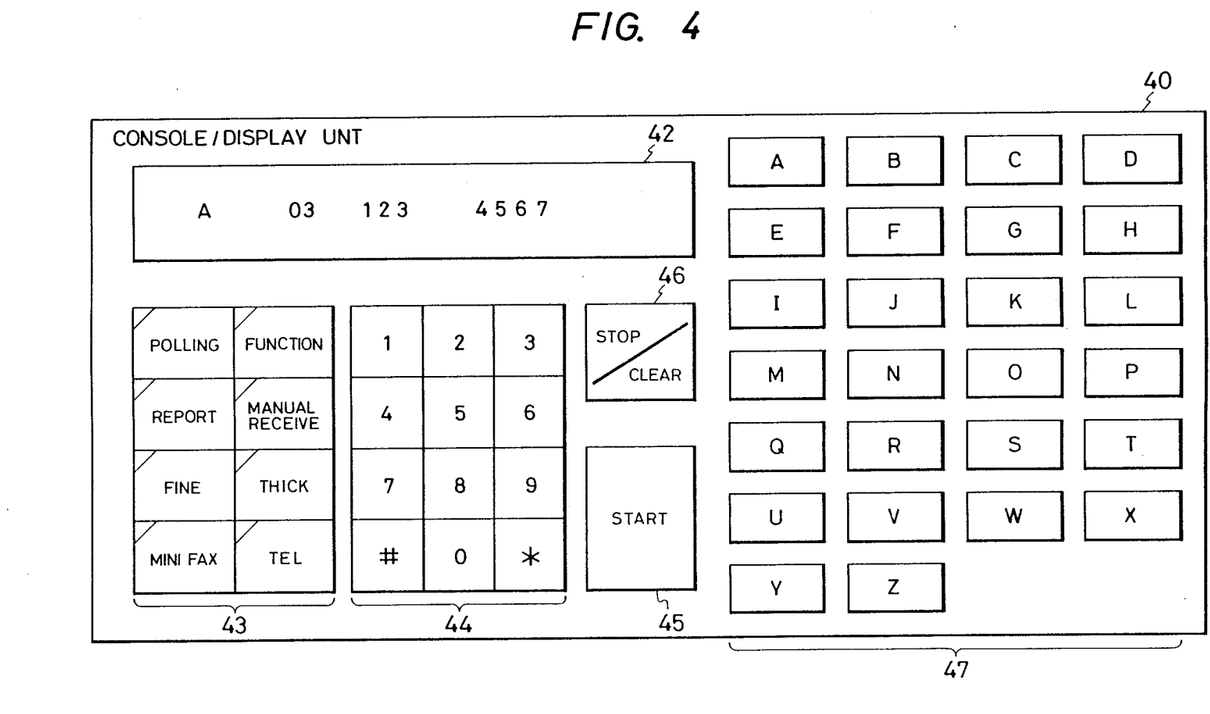
FIG. 4 is a representation showing a console/display unit 40 of the embodiment shown in FIG. 3.

FIG. 4 shows a console/display panel of the console/display unit 40.

Referring to FIG. 4, a liquid-crystal display 42 selectively displays mode data in which the facsimile system is set, a destination telephone number, a destination name, various alarm data, time data, and the like.

The panel includes mode setting keys 43 for setting modes of the facsimile system, known ten keys 44 for inputting a normal dialing telephone number and an abridged dialing telephone number, a start key 45 for starting a facsimile transmission or copy operation, a stop/clear key 46 for interrupting the facsimile transmission, reception, and copy operation or clearing the set mode or dialing telephone number, and 26, i.e., A to Z one-touch dial keys 47.

In this embodiment, two telephone numbers are assigned to each of abridged dial keys and one-touch keys, and a dialing destination by means of the one-touch key and the abridged dial key is selected in accordance with the presence/absence of an original sheet.

Figure 5:
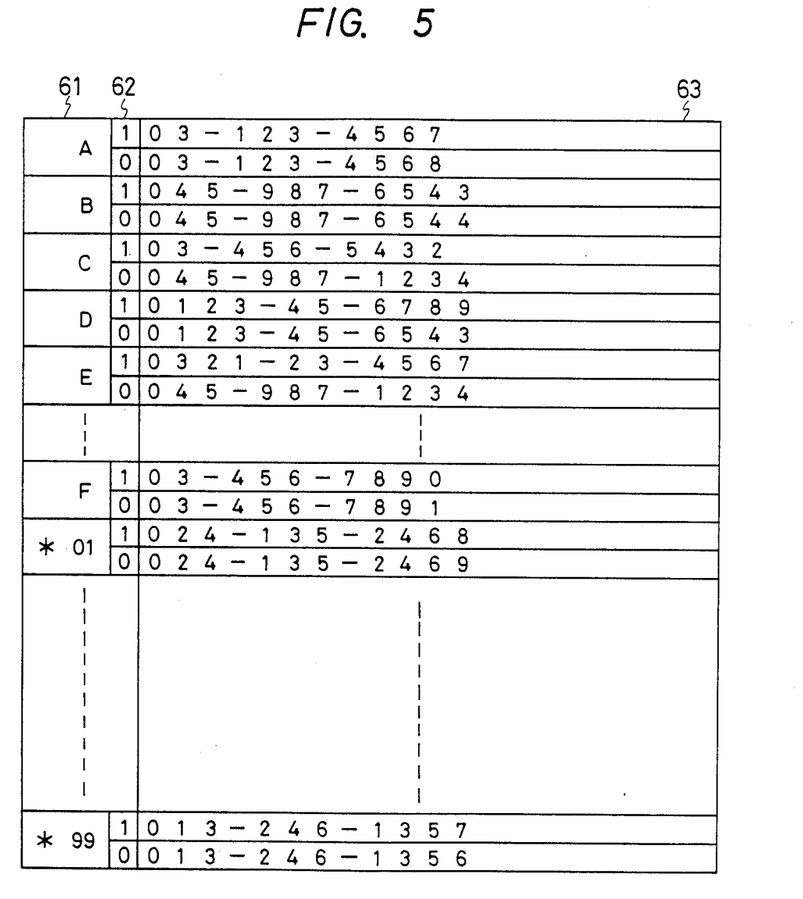
FIG. 5 is a table showing a storage content of a nonvolatile RAM 6 in FIG. 3.

FIG. 5 shows telephone numbers corresponding to one-touch dial keys A to Z and abridged dial keys *01 to *99 stored in the nonvolatile RAM 6.

As shown in FIG. 5, respective storage areas are allocated in the RAM 6 to correspond with the one-touch dial keys A to Z and the abridged dial keys *01 to *99. Each dial key storage area 61 stores two dialing data B to correspond with original presence/absence flags 62 ("1" indicates the presence of an original sheet and "0" indicates the absence of an original sheet).

For example, a telephone number "03-123-4567" for the original presence mode and a telephone number "03-123-4568" for the original absence mode are assigned to the one-touch dial key A, and a telephone number "024-135-2468" for the original presence mode and a telephone number "024-135-2469" for the original absence mode are assigned to the abridged dial key *01.

In this embodiment, two telephone numbers assigned to single one-touch dial key or abridged dial key in accordance with the presence/absence of an original sheet can be those for the facsimile system and the normal telephone of the same destination as in the one-touch dial keys A and B. Alternatively, two telephone numbers can be those for different destinations as in the one-touch dial key C.

Figure 6:
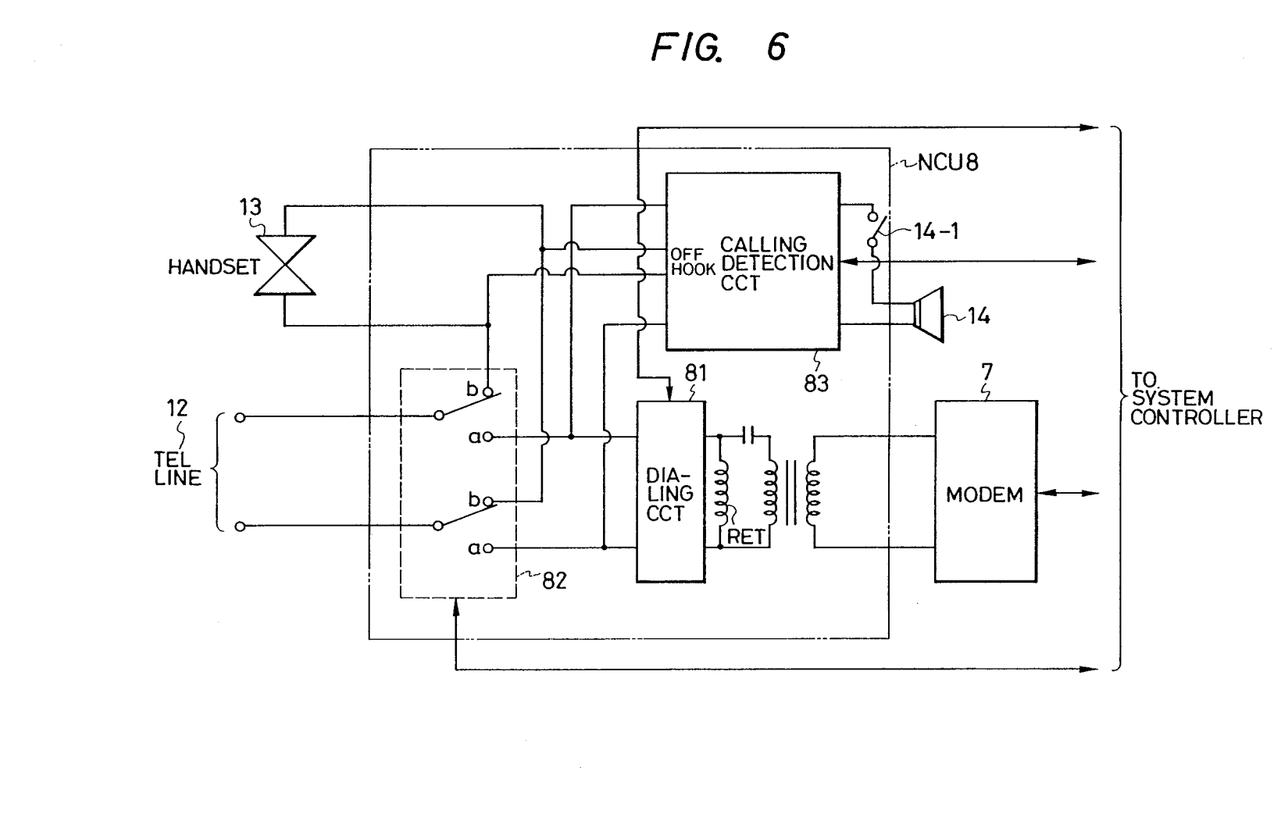
FIG. 6 is a block diagram showing details of an NCU 8.

FIG. 6 shows a detailed arrangement of the NCU 8.

Referring to FIG. 6, a dialing circuit 81 performs a dialing operation with respect to the telephone line 12 in accordance with dialing data output from the system controller 1.

A relay 82 switches the telephone line 12 to a handset 13 side b or a modem side a.

A calling detection circuit 83 detects a calling signal from the telephone line 12, and also detects if the handset 13 is off-hooked.

A loudspeaker 14 is arranged to monitor a signal from the telephone line 12.

Figure 7A:
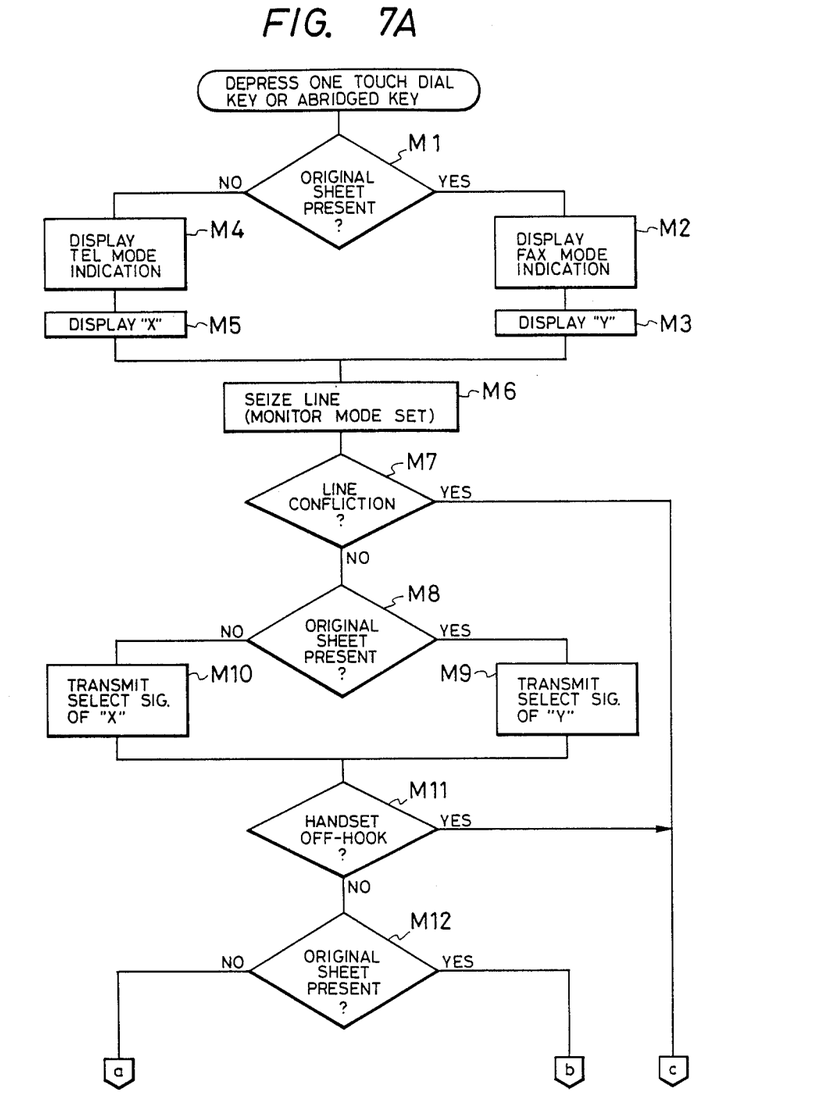
FIG. 7A and 7B are flow charts showing a control operation of a system controller 7 of the embodiment shown in FIG. 3.
Figure 7B:
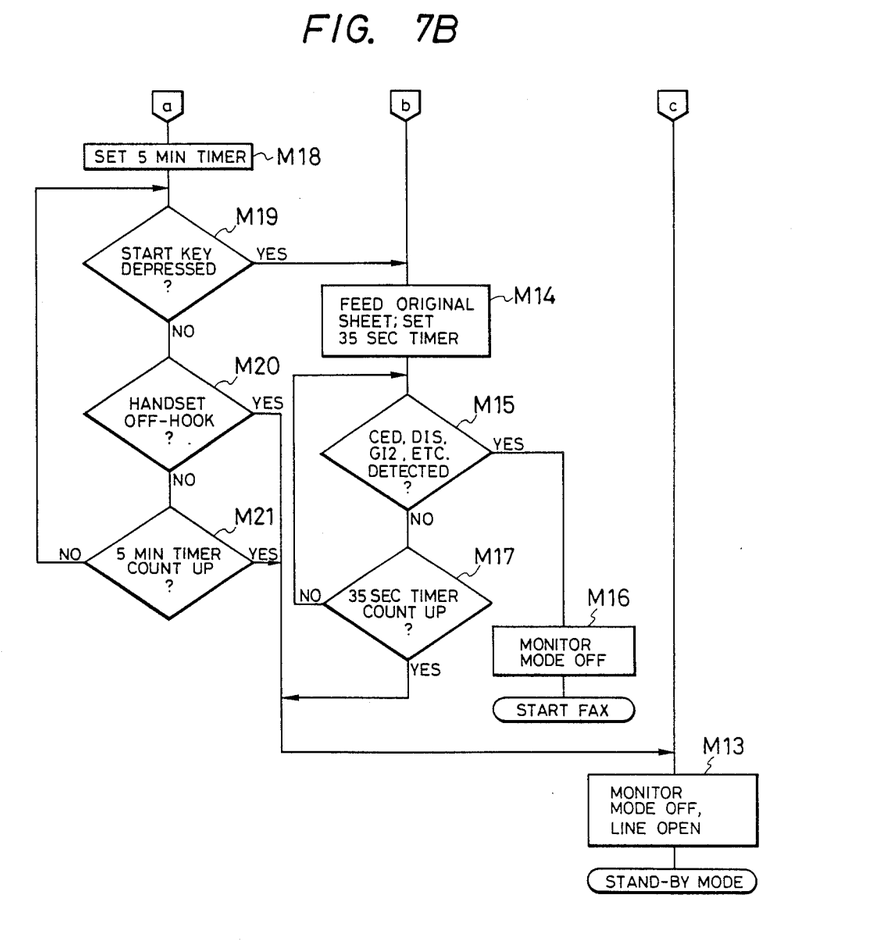

The operation of this embodiment with the above arrangement will be described with reference to the flow charts in FIGS. 7A and 7B showing the control operation of the system controller 1. Note that the flow charts shown in FIGS. 7A and 7B are also stored in the ROM 1A as well as the flow chart shown in FIG. 2.

If depression of any of the one-touch dial keys A to Z and the abridged dial keys *01 to *99 is detected by a normal key scan operation, the flow advances to step M1. The presence/absence of an original sheet 11 is detected in step M1 in accordance with the output from the sensor 10. If YES in step M1, the flow advances to step M2, and a facsimile mode indication is made on the display 42. In step M3, a telephone number "Y" for the original presence mode of the detected one-touch dial key or abridged dial key is read out from the RAM 6 and is displayed on the display 42. The flow then advances to step M6.

However, if NO in step M1, the flow advances to step M4, and telephone mode indication is made on the display 42. In step M5, a telephone number "X" for the original absence more of the detected one-touch dial key or abridged dial key is read out from the RAM 6 and is displayed on the display 42. The flow then advances to step M6.

In step M6, the telephone line is seized (the relay 82 is switched to the side a), and a switch 14-1 shown in FIG. 4 is turned on to enable the loudspeaker 14. The flow then advances to step M7 to check the presence/absence of a calling signal from the line 12 (i.e., detection of the presence/absence of a line conflict). If YES in step M7, the flow advances to step M13, and the switch 14-1 is turned off and the line 12 is opened (i.e., the relay 82 is switched to the side b). If NO in step M7, the presence/absence of an original sheet is detected in step M8. If YES IN STEP M8, the flow advances to step M9. In step M9, the dialing operation of the telephone number "Y" for the original presence mode of the depressed one-touch dial key or abridged dial key is performed by the dialing circuit 81, and a dialing signal is sent onto the telephone line 12. However, if NO in step M8, the flow advances to step M10. In step M10, the dialing operation of the telephone number "X" for the original absence mode of the depressed one-touch dial key or abridged dial key is performed by the dialing circuit 81, and a dialing signal is sent onto the telephone line 12.

It is then checked in step M11 if the handset 13 is off-hooked. If YES in step M11, the flow advances to step M13; otherwise, the flow advances to step M12. The presence/absence of an original sheet 11 is again detected in step M12. If YES in step M12, the flow advances to step M14, and the original sheet 11 is fed and a 35-sec timer is started. It is detected in steps M15 and M17 until counting of the 35-sec timer is over if facsimile signals, e.g., a called end discrimination signal (CED), a digital identification signal (DIS), and a group identification signal (GI2) are received. If the facsimile signals are received within 35 seconds, the switch 14-1 is turned off in step M16, thereby disabling the loudspeaker 14. Thereafter, facsimile transmission is performed. If the facsimile signals are not received within 35 seconds, the flow advances to step M13. In step M13 the monitor mode is OFF and the line is released. The stand-by mode results.

If NO in step M12, the flow advances to step M18. In step M18, a 5-min timer is set, and depression of the start key 45 (step M19) and off-hook detection of the handset 13 (step M20) are performed in steps M19, M20, and M21 until counting of the 5-min timer is over. If YES in step M19, the flow advances to step M14, and the facsimile transmission is performed. If YES in step M20 or if YES in step M21, the flow advances to step M13.

In this embodiment as described above, when depression of the one-touch dial key or abridged dial key is detected and when the dialing operation is performed, the presence/absence of an original sheet is detected (steps M1 and M8), and two telephone numbers assigned to a single key is selectively read out from the RAM 6 in accordance with the detection result, thus performing the dialing operation.

In this embodiment, after the one-touch dial key or abridged dial key is depressed, if an original sheet is detected, the operation mode is automatically switched to the facsimile transmission mode, and if no original sheet is detected, the operation mode is switched to the telephone mode, thus allowing a simple operation for an operator In addition, a dialing operation of many telephone numbers can be performed by the reduced number of keys.

In this embodiment, when the operation mode is switched to the telephone mode, since a signal from the telephone line 12 is monitored through the loudspeaker 14, an operator can off-hook the handset 13 to communicate with a destination when the voice of the destination is output from the loudspeaker 14. If the voice of the destination is not output from the loudspeaker after 5 minutes have passed from the dialing operation, the telephone line 12 is automatically opened. Therefore, the operator need not wait the response from the destination while off-hooking the handset 13.

In the telephone mode, if the operator sets an original sheet within 5 minutes from the dialing operation and depresses the start switch 45, the flow advances from step M19 to step M14, and the facsimile transmission is performed. Thus, two telephone numbers of different facsimile systems can be assigned to a single one-touch dial key or abridged dial key.

According to the above embodiments, the number of selection key switches can be greatly reduced as compared to the assigned number of destination telephone numbers, and a user can selectively use the telephone mode and the facsimile mode in accordance with the presence/absence of an original sheet to be transmitted.

In the above embodiments, when an original sheet to be transmitted is detected, the operation mode is automatically switched to the facsimile transmission mode. Alternatively, if an original sheet is detected, the operation mode can be switched to the telephone mode, and after an operator confirms connection with a destination, i.e., only when a facsimile is connected, he can depress a transmission start key. In this case, two normal telephone numbers can be assigned to a single key.

In the above embodiments, different transmission operations of destination telephone numbers using one-touch keys or abridged dialing can be performed in accordance with whether or not transmission data is stored in a memory or the like.

The above embodiments are not limited to the facsimile system but can be applied to all other communication systems having an automatic dialing function.

What is claimed is:
1. A data communication apparatus comprising:
   data communication means for communicating data;
   selection signal send means for automatically sending to a line a selection signal for selecting a desired destination station so as to connect the line to the destination station;

detection means for detecting whether data is set in said data communication means;

memory means for storing a plurality of selection signals therein;

instructing means for instructing said apparatus to send one of at least two selection signals stored in said memory means from said apparatus;

control means for retrieving selection signal from said memory means and causing said selection signal send means to send the retrieved selection signal to the line;

wherein said control means determines which one of said at least two selection signals is sent to the line by said selection signal send means in accordance with whether said detection means detects that data is set; and wherein said control means repeatedly discriminates whether data is set and causes said data communication means to effect a data communication in accordance with the repeated discrimination result.

2. An apparatus according to claim 1, wherein said control means against discriminates whether data is set after the sending out of the selection signal and causes said data communication means to effect data communication if said data is set.

3. An apparatus according to claim 1, wherein said data communication means includes a memory for storing data, and wherein said detection means detects whether data is stored in the memory.

4. An apparatus according to claim 1, wherein said data communication means includes means for reading a document and send means for sending read image data, and wherein said detection means detects whether a document is set in said reading means.

5. An apparatus according to claim 1, wherein said selection signal is a dialing signal.

6. Apparatus according to claim 5, wherein said instructing means is a one-touch dial key.

7. An apparatus according to claim 1, wherein said instructing means is a key switch.

8. An apparatus according to claim 7, further comprising speech communication means for communication speech, wherein said memory means stores a selection signal for selecting a destination station capable of data communication and a different selection signal for selecting another destination station capable of speech communication, and wherein said control means is adapted to cause a selection signal for selecting a destination station capable of data communication to be sent from said apparatus when said detection means detects that data is set.

* * * * *

UNITED STATES PATENT AND TRADEMARK OFFICE
CERTIFICATE OF CORRECTION

PATENT NO. : 4,833,705
DATED : May 23, 1989
INVENTOR(S) : MAKOTO KOBAYASHI    Page 1 of 2

It is certified that error appears in the above-identified patent and that said Letters Patent is hereby corrected as shown below:

SHEET 7 of 8

Figure 7A, " LINE CONFLICTION " should read -- LINE CONFLICT --.

COLUMN 2

Line 9, "system," should read --system--.

COLUMN 4

Line 61, "modem side a." should read --modem 7 side a.--.

COLUMN 5

Line 20, "more" should --mode--.
Line 34, "IN STEP M8," should read --in step M8,--.

COLUMN 6

Line 9, "is" should read --are--.
Line 30, "wait" should read --wait for--.

COLUMN 7

Line 23, "against" should read --again--.

UNITED STATES PATENT AND TRADEMARK OFFICE
CERTIFICATE OF CORRECTION

PATENT NO. : 4,833,705
DATED : May 23, 1989
INVENTOR(S) : MAKOTO KOBAYASHI

Page 2 of 2

It is certified that error appears in the above-identified patent and that said Letters Patent is hereby corrected as shown below:

COLUMN 8

Line 12, "Apparatus" should read --An apparatus--.

Signed and Sealed this

Third Day of April, 1990

Attest:

HARRY F. MANBECK, JR.

Attesting Officer

Commissioner of Patents and Trademarks